United States Patent
Riedel et al.

(10) Patent No.: US 8,474,345 B2
(45) Date of Patent: Jul. 2, 2013

(54) TRANSMISSION WITH REVERSE GEAR BRAKE

(75) Inventors: Paulo A. Riedel, Bragança Paulista (BR); Renato Freitas Silva, Santo André (BR); Roberto Sintoni, Sao Paulo (BR); Roberto Camargo Fo, Sao Paulo (BR)

(73) Assignee: GM Global Technology Operations LLC, Detroit, MI (US)

( * ) Notice: Subject to any disclaimer, the term of this patent is extended or adjusted under 35 U.S.C. 154(b) by 498 days.

(21) Appl. No.: 12/869,403

(22) Filed: Aug. 26, 2010

(65) Prior Publication Data
US 2012/0048045 A1 Mar. 1, 2012

(51) Int. Cl.
*F16H 3/38* (2006.01)

(52) U.S. Cl.
USPC ............... 74/339; 74/404; 192/48.8; 192/51

(58) Field of Classification Search
USPC .............. 74/339, 404; 192/48.8, 51, 52.2, 192/52.3, 52.6
See application file for complete search history.

(56) References Cited

U.S. PATENT DOCUMENTS

| | | | | |
|---|---|---|---|---|
| 1,822,107 A * | 9/1931 | Murray | | 74/339 |
| 2,319,496 A * | 5/1943 | Fishburn | | 74/339 |
| 2,862,398 A * | 12/1958 | Zeidler et al. | | 74/339 |
| 3,745,847 A * | 7/1973 | Worner et al. | | 74/339 |
| 5,105,927 A * | 4/1992 | Frost | | 192/53.31 |
| 5,113,986 A * | 5/1992 | Frost | | 192/53.341 |
| 5,907,972 A * | 6/1999 | Del Sole | | 74/411.5 |
| 6,295,885 B1 * | 10/2001 | Delsole | | 74/339 |

* cited by examiner

*Primary Examiner* — William C Joyce (57) ABSTRACT

A transmission having an input shaft and an output shaft, where an input gear is rotatably fixed for common rotation by the input shaft, an output gear is rotatably fixed for common rotation by the output shaft, and a third shaft is disposed generally parallel to the input and output shafts and has an outer surface that includes a splined portion and a non-splined portion. A reverse gear assembly rotatably fixed for common rotation by the third shaft includes a reverse gear, a synchronizer member, an annular retaining member, and a synchronizer spring. The reverse gear is disposed on the third shaft, and has a hub extending from a first side. The reverse gear assembly is selectively axially moveable along the third shaft to engage the input and output gears.

20 Claims, 7 Drawing Sheets

*Fig-6B*

TRANSMISSION WITH REVERSE GEAR BRAKE

FIELD

The present disclosure relates generally to transmissions and more specifically to a transmission having a reverse gear brake employed to reduce gear clash when shifting into a reverse gear ratio.

BACKGROUND

The statements in this section merely provide background information related to the present disclosure and may or may not constitute prior art.

A typical manual transmission includes a plurality of shafts, gears, shift mechanisms, synchronizers or other torque-transmitting mechanisms that cooperate to provide a plurality of forward and reverse gear or speed ratios. The transmission input shaft is selectively connected to an engine output shaft and includes a number of gears that are selectively connectable to the input shaft using, for example, synchronizers. The gears of the input shaft mesh with corresponding gears that are selectively connectable to an output shaft. To achieve a particular forward gear ratio between the transmission input and output shafts a shift mechanism, such as a manual shifter, controls the engagement of the synchronizers with the desired gears. To shift from the neutral gear to a reverse gear ratio, a reverse gear is used to slide between an input shaft gear and an output shaft gear to reverse the rotational direction of the output shaft.

The reverse gear selectively meshes with the input shaft reverse gear. When meshed, both the input shaft reverse gear and the reverse gear rotate together at about the same speed. The reverse gear then engages with the output shaft gear to transfer torque from the input shaft to the output shaft. The output shaft is usually stationary or rotating in the opposite direction from the reverse gear. If the output shaft is stationary or rotating in the opposite direction, the meshing of the reverse gear with the output gear can cause an impact or gear clash that creates a loud scratching and grinding noise. This noise can be especially objectionable if the reverse gear is rotating at a high speed relative to the output shaft. Gear clash is detrimental to the long term durability of the transmission and can be the source of costly customer repair bills. A reverse gear synchronizer system can be employed to stop the reverse gear from rotating when engaging with the output shaft, however this reverse gear synchronizer system can be costly to implement.

Accordingly, there is room in the art for a transmission that includes a cost-effective mechanism to reduce gear clash by reducing the input shaft and reverse gear rotational speed when the driver is shifting into a reverse gear ratio.

SUMMARY

The present invention provides a transmission having an input shaft and an output shaft. An input gear is rotatably fixed for common rotation by the input shaft and an output gear is rotatably fixed for common rotation by the output shaft. A third shaft is disposed generally parallel to the input and output shafts, and has an outer surface that includes a splined portion and a non-splined portion. A reverse gear assembly rotatably fixed for common rotation by the third shaft is provided. The reverse gear assembly includes a reverse gear, a synchronizer member, a synchronizer spring, and a retaining member. The reverse gear is disposed on the third shaft and has a first side, a second side opposite the first side, and a hub extending from the first side. The hub includes an inner gear surface and an outer gear surface, where the inner gear surface has a conical profile. The synchronizer member is disposed on and slidable between the splined portion and the non-splined portion of the third shaft. The synchronizer member has an inner synchronizer surface defining an aperture and a conical outer synchronizer surface. The outer synchronizer surface opposes and is frictionally engaged with the inner gear surface the hub of the reverse gear to reduce relative rotation between the reverse gear and the synchronizer member. The inner synchronizer surface has at least one radially extending tab selectively engagable with the splined portion of the third shaft. The annular retaining member is disposed on the third shaft and has an inner retaining surface. A portion of the inner retaining surface is fixedly engaged with the outer gear surface of the hub. The synchronizer spring is disposed on the third shaft and located between the retaining member and the synchronizer member. The inner surface of the retaining member makes contact with and pre-loads the spring. The spring exerts a biasing force on the synchronizer member to selectively axially move the synchronizer from the splined to the non-splined portions of the third shaft. The reverse gear assembly is selectively axially moveable along the third shaft to engage the input and output gears.

In an embodiment of the present invention, the reverse gear assembly is selectively disposed in at least one of a first position, a second position, and a third position. In the first position the reverse gear is not in contact with the input gear and the output gear. In the second position the reverse gear is meshed with the input gear member. The at least one radially extending tab of the synchronizer member is engaged with the splined portion of the third shaft such that the synchronizer member is generally unable to rotate about the third shaft. In the third position the reverse gear is meshed with both of the input gear and the output gear.

In another embodiment of the present invention, the at least one radially extending tab is not engaged with the splined portion of the third shaft in the third position. The synchronizer member rotates about the third shaft in the third position.

In yet another embodiment of the present invention, the reverse gear further includes a second hub extending from the second side. The second hub has a radial groove that is configured to receive a selectively operated linkage member.

In an embodiment of the present invention, the synchronizer member includes four radially extending tabs.

In another embodiment of the present invention, the synchronizer spring is a wave type spring.

In yet another embodiment of the present invention, the outer synchronizer surface is textured and to provide frictional engagement between the synchronizer member and the reverse gear.

In an embodiment of the present invention, the textured surface includes a series of radially oriented raised ridges.

In another embodiment of the present invention, the reverse gear of the input shaft has a first width and the sleeve gear of the output shaft has a second width, and wherein the first width is greater than the second width.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
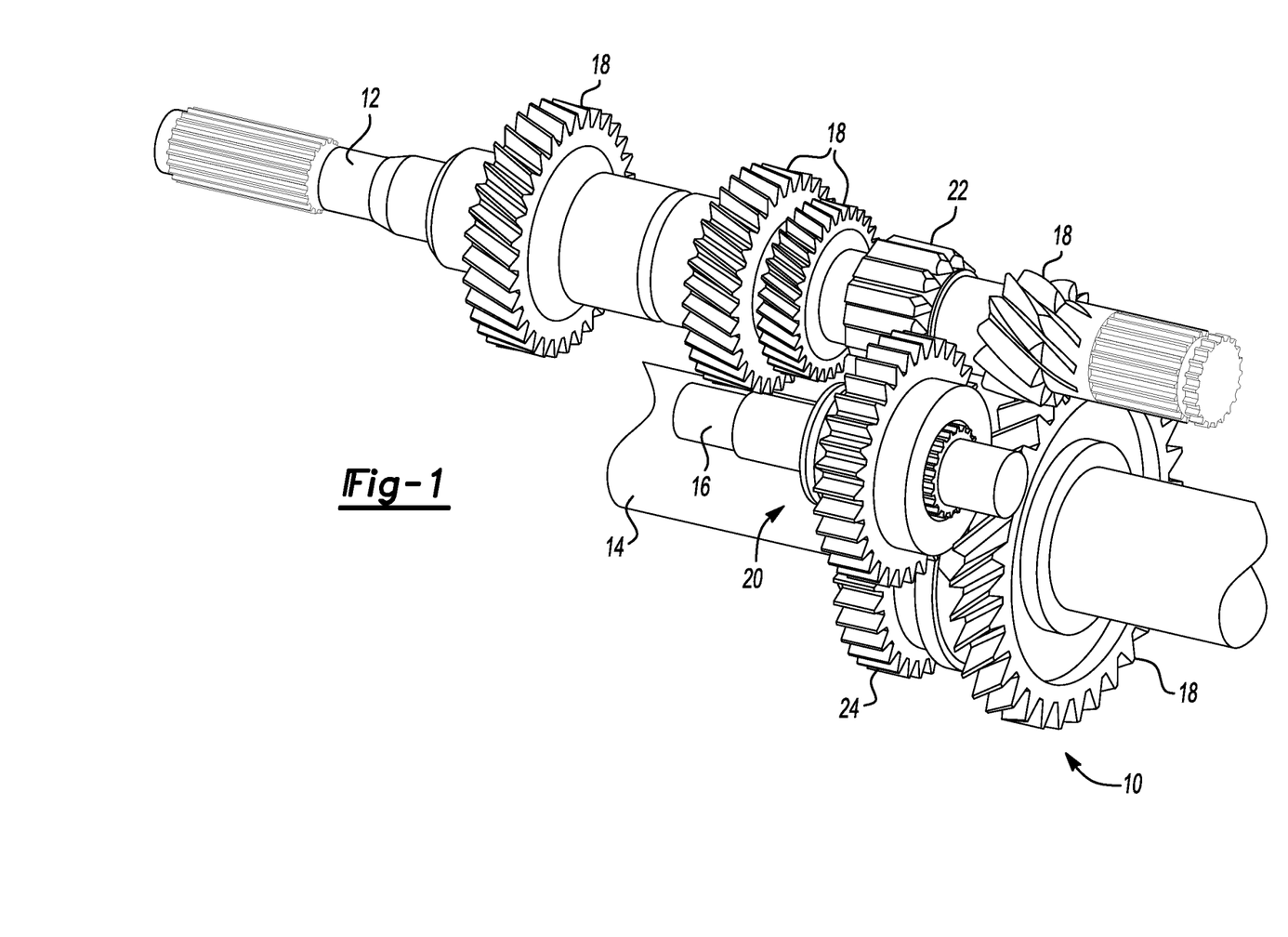
FIG. 1 is a perspective view of an exemplary transmission having an input shaft, an output shaft, and a reverse gear assembly.

With reference to FIG. 1, a perspective view of an exemplary transmission 10 is shown having an input shaft 12, a main or output shaft 14, and a reverse shaft 16 that are supported by a transmission housing (not shown). The input shaft 12 is connected to an engine or prime mover output (not shown) and the main shaft 14 is connected to a vehicle drive shaft (not shown) that provides torque to a drive wheel of a vehicle. The input shaft 12 and the output shaft 14 each support a plurality of gears 18 that intermesh to form a plurality of gear sets. The reverse shaft 16 is disposed parallel to the input shaft 12 and the output shaft 14 and is fixedly supported by the transmission housing. The reverse shaft 16 supports a reverse gear assembly 20 that selectively moves along the reverse shaft 16 to engage a reverse gear or member 22 of the input shaft 12 and a sleeve gear or member 24 on the output shaft 14. When the transmission 10 shifts from a neutral gear ratio to a reverse gear ratio, the reverse gear assembly 20 first meshes with the reverse gear 22 of the input shaft 12. The reverse gear assembly 20 then meshes with the sleeve gear 24 of the output shaft 14.

Figure 2A:
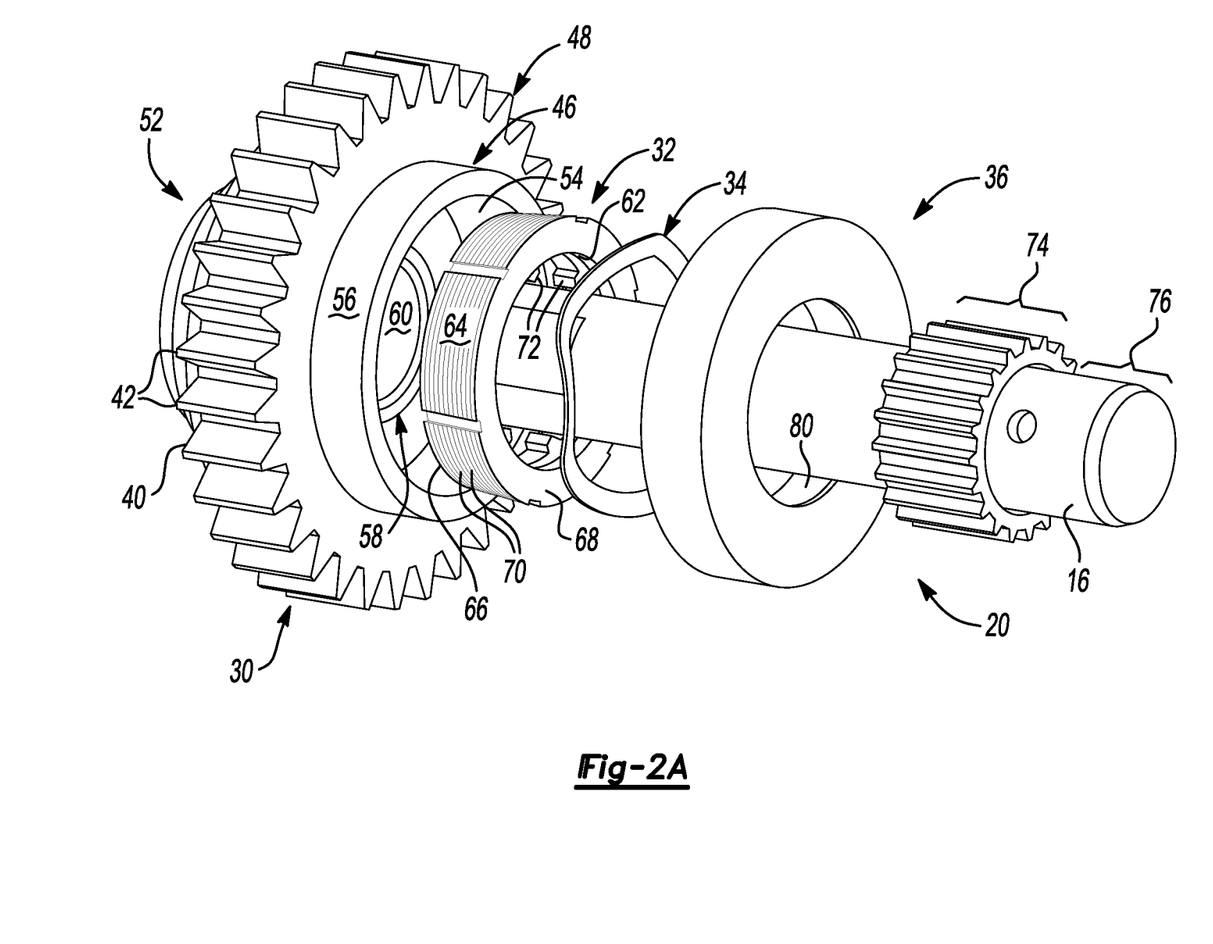
FIG. 2A is an exploded view of a reverse gear assembly of the transmission illustrated in FIG. 1.
Figure 2B:
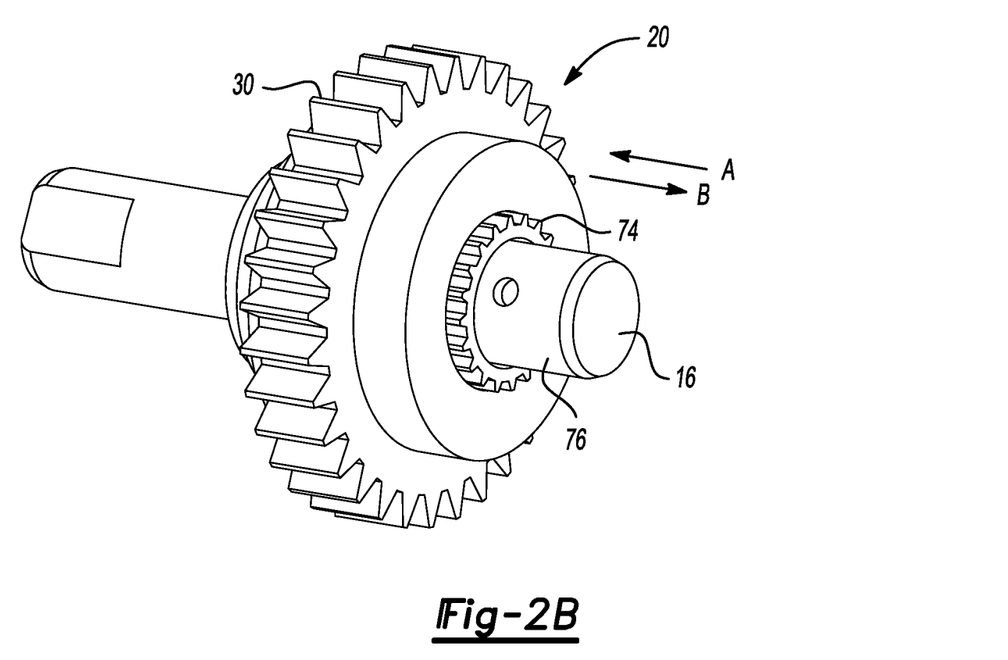
FIG. 2B is a perspective view of the reverse gear assembly engaged along a splined portion of a reverse shaft.
Figure 2C:
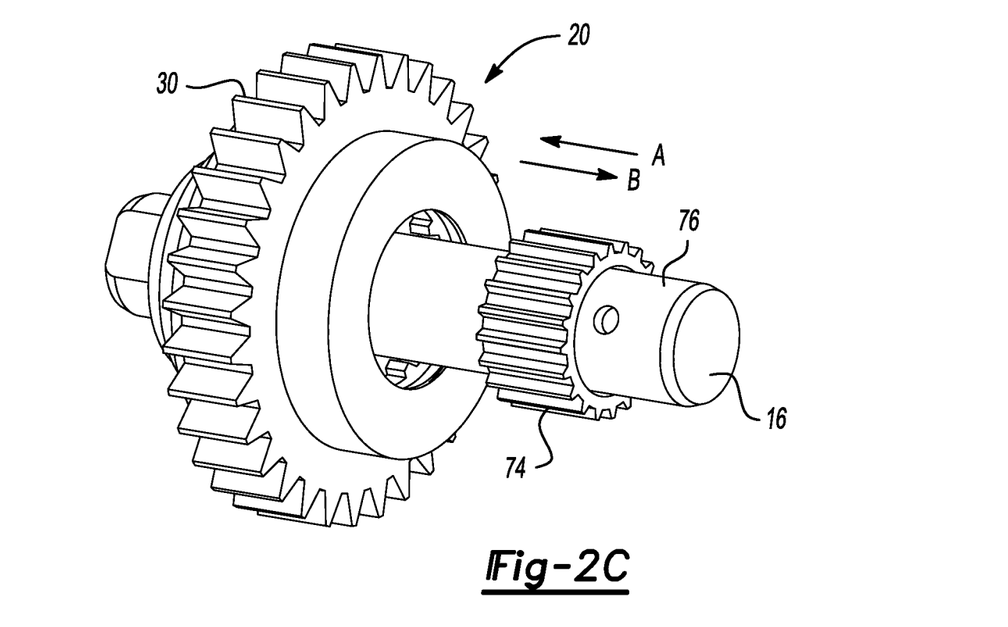
FIG. 2C is a perspective view of the reverse gear assembly not engaged with the splined portion of the reverse shaft.
Figure 3A:
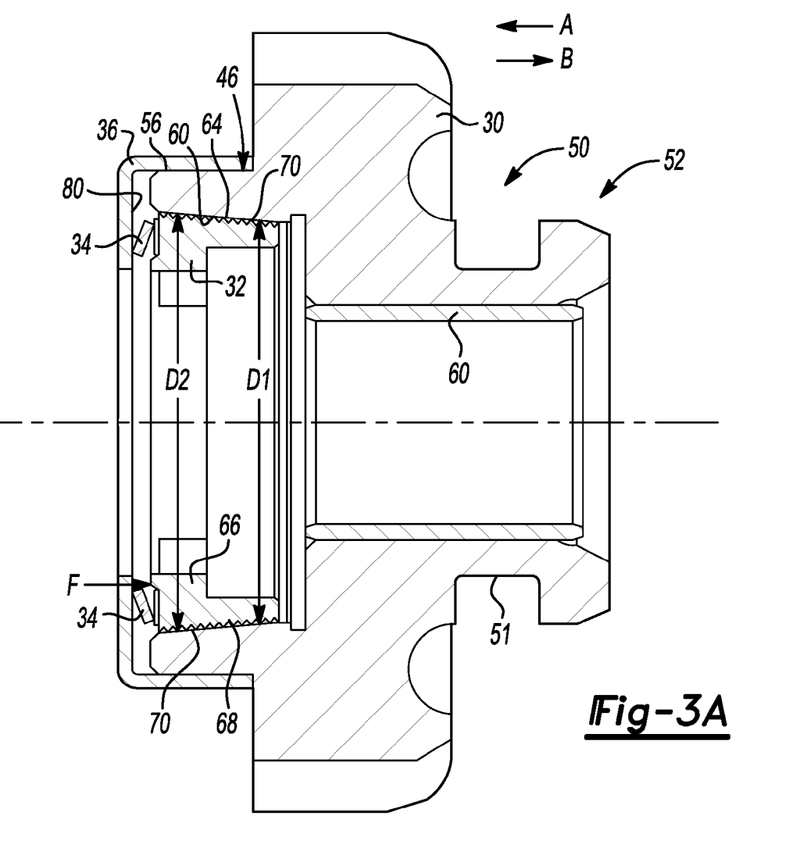
FIG. 3A is a cross sectioned view of a portion of the reverse gear assembly.

Referring now to FIGS. 2A-2C, the reverse gear assembly 20 is shown in a disassembled state in FIG. 2A and in an assembled state in FIGS. 2B-2C. Turning now to FIG. 2A, the reverse gear assembly 20 includes a reverse gear member 30, a generally conical synchronizer member 32, a synchronizer biasing member or spring 34, and a retainer member 36. The reverse gear member 30 has an outer surface 40 having a plurality of gear teeth 42 configured to slidably mesh with another rotating gear. The reverse gear member 30 also includes a first generally conical brake hub 46 on a first side 48 of the reverse gear 30 as well a second grooved linkage hub 50 (shown in FIG. 3A) on a second side 52 of the reverse gear 30. The brake hub 46 includes an inner surface 54 and an outer surface 56. Referring to FIG. 3A, the second grooved linkage hub 50 has a radial groove 51 configured to receive a selectively operated linkage device, such as a shift fork linkage. Turning back to FIG. 2A, the reverse gear 30 also includes an inner diameter 58 that receives a bearing 60. The bearing 60 is employed to improve rotational losses and wear as the reverse gear 30 rotates about the reverse shaft 16.

The synchronizer member 32 has an inner surface 62, an outer surface 64, a first end 66 and a second end 68. In the embodiment as shown in FIG. 2A, the outer surface 64 of the synchronizer member 32 has a generally conical profile, and is textured to have a plurality of radially oriented raised ridges 70. Referring to FIG. 3A, the first end 66 of the synchronizer member 32 has a first diameter D1 and the second end 68 has a second diameter D2, where the first diameter D1 is less than the second diameter D2. The outer surface 64 the synchronizer member 32 is textured with ridges 70 in an effort to frictionally engage the inner surface 60 of the brake hub 46 of the reverse gear 30. This engagement reduces the relative rotation between the reverse gear 30 and the synchronizer member 32. Specifically, the outer surface 64 of the synchronizer member 32 generally corresponds to the inner surface 60 of the brake hub 46, and the textured outer surface 64 makes contact with and facilitates a frictional engagement between the synchronizer member 32 and the reverse gear 30. Although FIGS. 2A and 3A illustrate the outer surface 64 of the synchronizer member 32 having ridges 70, those skilled in the art will appreciate that other types of textured features may be used as well be facilitate a frictional engagement between the synchronizer member 32 and the reverse gear 30. For example, in an alternative embodiment the outer surface 64 of the synchronizer member 32 could be knurled.

Figure 3B:
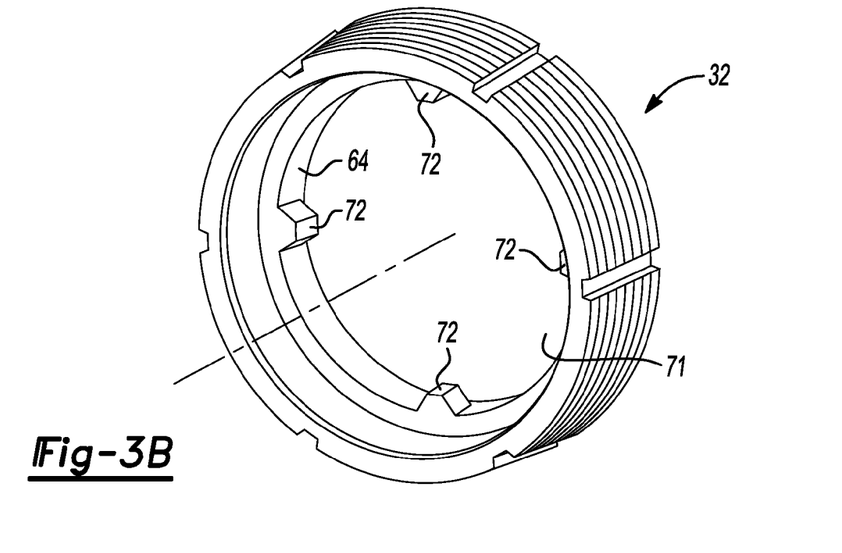
FIG. 3B is a perspective view of a synchronizer member of the reverse gear assembly illustrated in FIG. 1.

Turning now to FIG. 3B, the inner surface 64 of the synchronizer member 32 defines an aperture 71. The inner surface 64 includes at least one radially extending tab 72. In the embodiment as shown, the synchronizer member 32 includes four equally spaced tabs 72, however it is understood that any number of tabs 72 may be used as well. Turning back to FIG. 2A, the tabs 72 of the synchronizer member 32 are used to selectively engage the synchronizer member 32 with a splined portion 74 of the reverse shaft 16. The reverse shaft 16 also includes a generally smooth or non-splined portion 76. The synchronizer member 32 selectively axially moves along the reverse shaft 16 between the splined and non-splined portions 72 and 74.

The synchronizer spring 34 is disposed on the reverse shaft 16 between the synchronizer member 32 and the retainer member 36. The synchronizer spring 34 is employed to exert a biasing force upon the synchronizer member 32, thereby selectively axially moving the synchronizer member 32 along the reverse shaft 16. Although FIG. 2A illustrates the synchronizer spring as a wave type spring, those skilled in the art will appreciate that any type of biasing member that exerts a biasing force may be used as well.

The annular retaining member 36 is disposed on the reverse shaft 16, and has an inner surface 80. Turning to FIG. 3A, a portion of the inner surface 80 of the retaining member 36 is fixedly engaged with the outer surface 56 of the brake hub 46. In one embodiment, the retaining member 36 is press-fit to the outer surface 56 of the brake hub 46, however it is understood that other approaches may be used as well to fixedly engage the retaining member 36 with the brake hub 46. The inner surface 80 of the retaining member 36 contacts the synchronizer spring 34 and is fixedly engaged with the brake hub 36 to pre-load the synchronizer spring 34. The synchronizer spring 34 is pre-loaded by the retaining member 36 to exert a biasing force F upon the synchronizer member 32. The biasing force F of the synchronizer spring 34 selectively urges the reverse gear assembly 20 in a direction A.

Turning to FIG. 2B, the reverse gear 30 is unable to freely rotate about the reverse shaft 16 when the tabs 72 of the synchronizer member 32 (FIG. 3B) are engaged with the splined portion 74 of the reverse shaft 16. This is because the tabs 72 of the synchronizer member 32 are engaged with the splined portion 74 of the reverse shaft 16, thereby locking the synchronizer member 32 in place in relation to the reverse shaft 16. Turning to FIG. 2C, as the reverse gear assembly 20 is urged in the direction A by the biasing force F exerted by the synchronizer spring 34 (seen in FIG. 3A), the tabs 72 of the synchronizer member 32 disengage with the splined portion 74 of the reverse shaft 16, and the synchronizer member 32 and the reverse gear 30 are able to rotate about the reverse shaft 16. The reverse gear assembly 20 can be axially moved along the reverse shaft 16 in the direction B a selectively operated linkage device, such as a shift fork linkage, that engages with the radial groove 51 of the reverse gear 30 (shown in FIG. 3A).

Figure 4A:
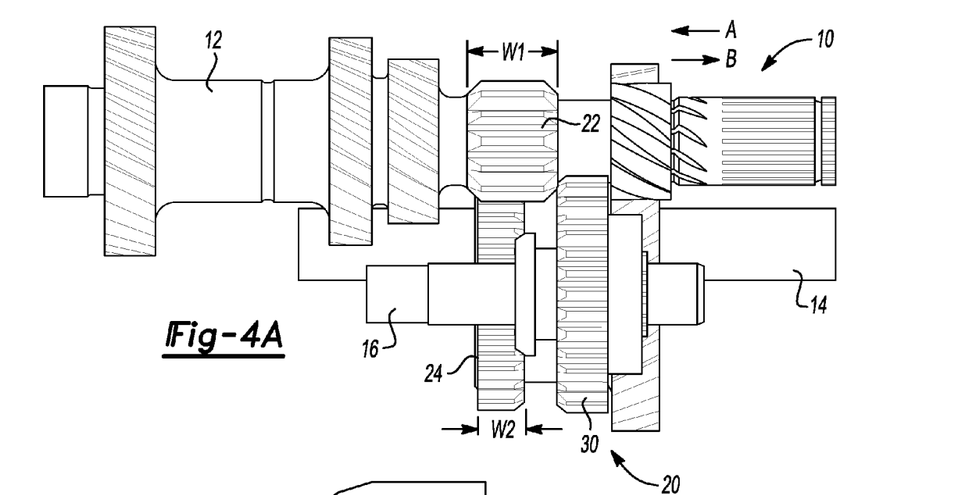
FIG. 4A is a plan view of the input shaft, the output shaft and the reverse gear assembly shown in FIG. 1 in a first disengaged position.
Figure 4B:
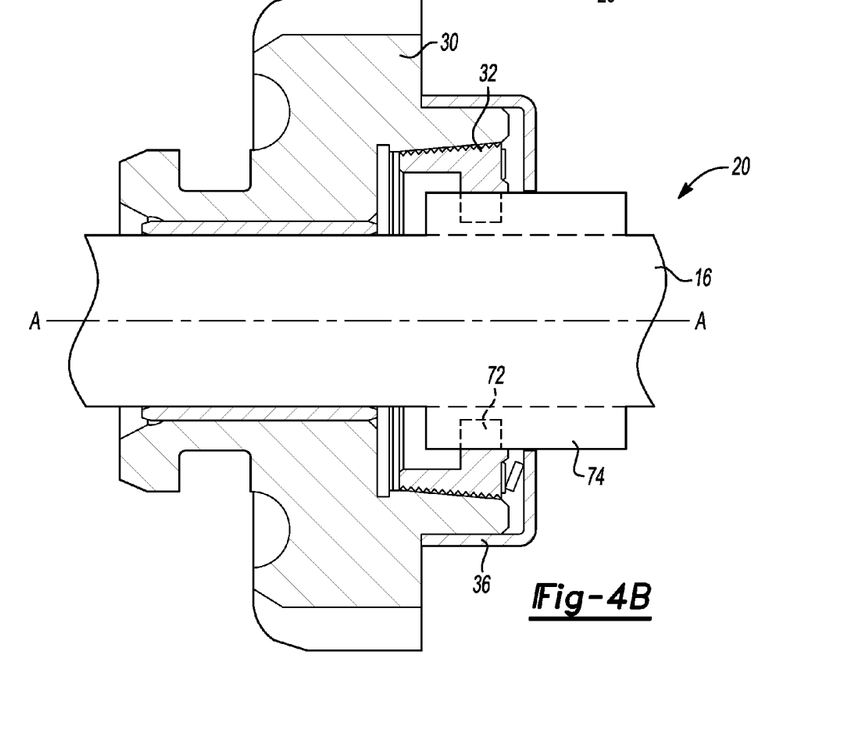
FIG. 4B is a cross sectioned view of the reverse gear assembly in the first disengaged position.
Figure 5A:
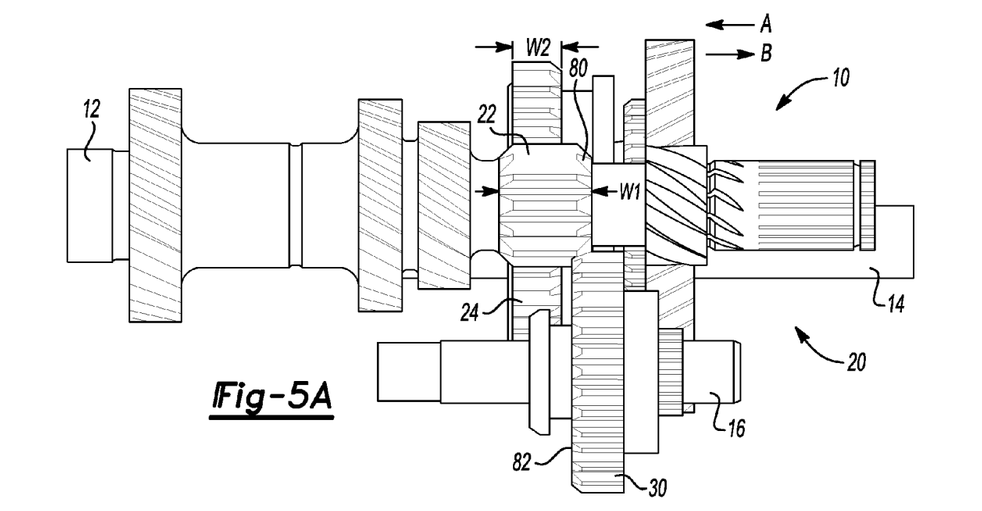
FIG. 5A is a plan view of the input shaft, the output shaft and the reverse gear assembly shown in FIG. 1 in a second partially engaged position.
Figure 5B:
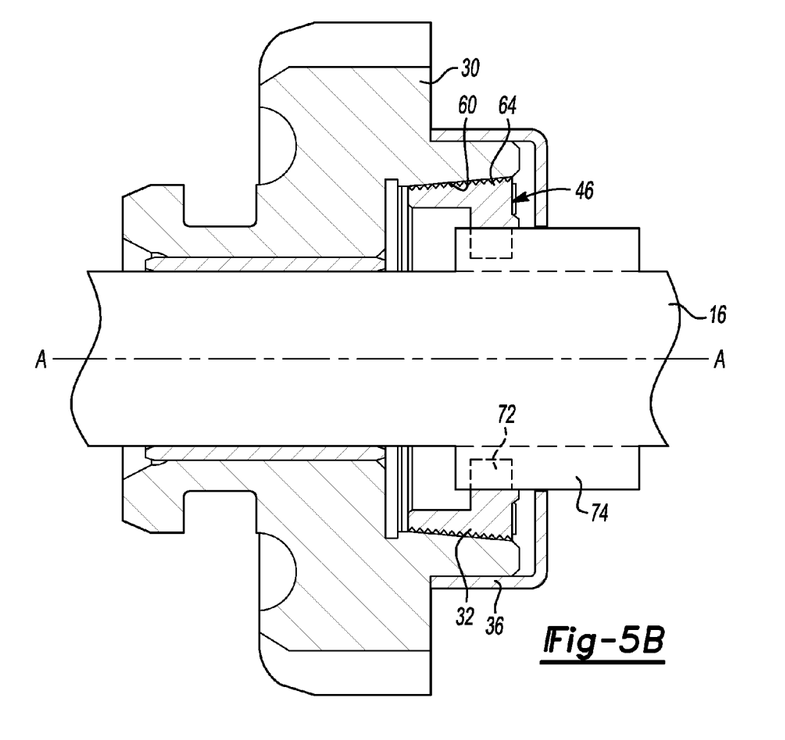
FIG. 5B is a cross sectioned view of the reverse gear assembly in the second partially engaged position.
Figure 6A:
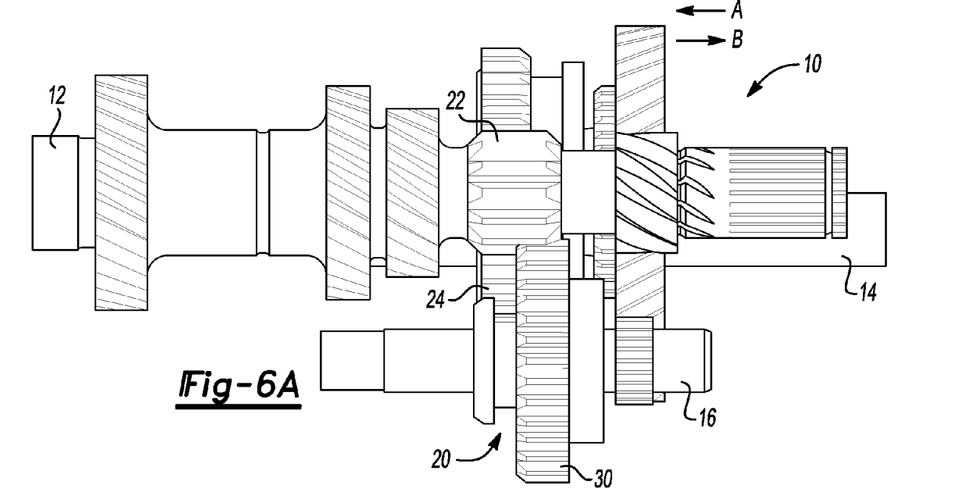
FIG. 6A is a plan view of the input shaft, the output shaft and the reverse gear assembly shown in FIG. 1 in a third engaged position.
Figure 6B:
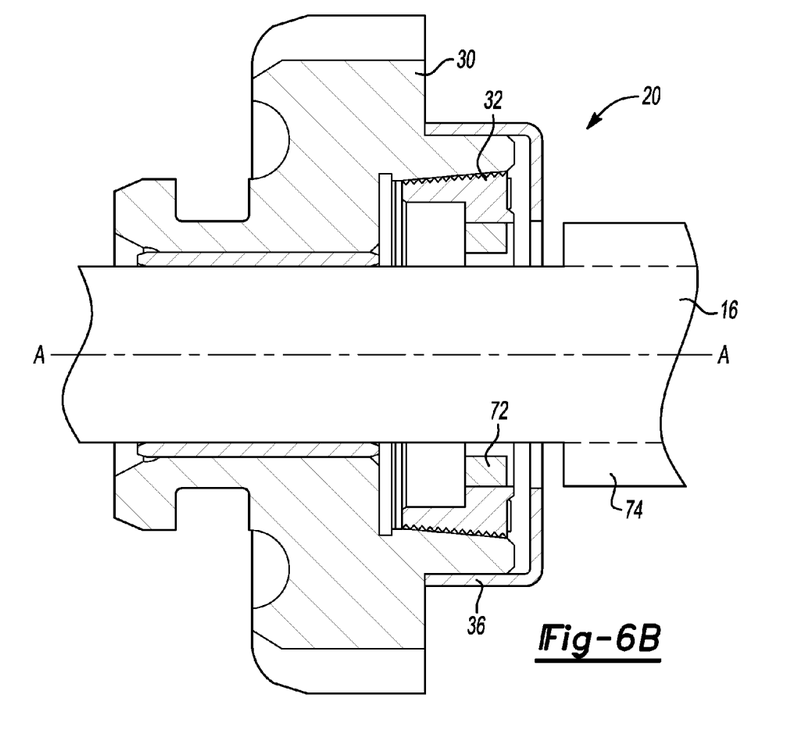
FIG. 6B is a cross sectioned view of the reverse gear assembly in the third engaged position.

Referring generally to FIGS. 4A-6B, an exemplary illustration of the reverse gear assembly 20 engaging with each of the input and the output shafts 12 and 14 is shown as the transmission 10 shifts from a neutral gear ratio to a reverse gear ratio. FIGS. 4A, 5A, and 6A are an illustration of the reverse gear assembly 30 in three different positions relative to the input and output shafts 12 and 14. The reverse gear 30, the reverse gear 22 of the input shaft 12, and the sleeve gear 24 of the output shaft 14 each employ gear teeth that are designed to slidably engage with one another. Specifically, the reverse gear 30 slidably engages with both the reverse gear 22 of the input shaft 12 and the sleeve gear 24 of the output shaft 14. FIGS. 4B, 5B and 6B are a cross-sectional view of the reverse gear assembly 20 positioned on the reverse shaft 16 in each of the three different positions.

Referring to FIGS. 4A-4B, a first unengaged position of the reverse gear assembly 20 is shown, where the transmission is in the neutral gear ratio. In the first unengaged position, the reverse gear assembly 20 does not contact or mesh with either the reverse gear 22 of the input shaft 12 or the sleeve gear 24 of the output shaft 14. Referring specifically to FIG. 4A, the reverse gear 22 of the input shaft 12 has a first width W1 and the sleeve gear 24 of the output shaft 14 has a second width W2. The first width W1 is greater than the second width W2 such that the reverse gear 22 is situated closer to the reverse gear 30 than the sleeve gear 24. As the reverse gear assembly 20 is axially moved along the reverse gear shaft 16 in the direction A, the reverse gear 30 will first mesh with the reverse gear 22 of the input shaft 12 before meshing with the sleeve gear 24 of the output shaft 16. Turning to FIG. 4B, the tabs 72 of the synchronizer member 32 are engaged with the splined portion 74 of the reverse shaft 16. When the reverse gear assembly 20 is in the first unengaged position, the synchronizer member 32 is locked in place relative to the reverse shaft 16. Therefore, the synchronizer member 32 is generally unable to rotate about an axis A-A of the reverse shaft 16.

FIGS. 5A-5B illustrate the reverse gear assembly 20 in a second partially engaged position. The reverse gear assembly 20 is urged along the reverse shaft 16 in the direction A by the biasing force F exerted by the synchronizer spring 34 (shown in FIG. 3A) from the first unengaged position (shown in FIG. 4A) to the second partially engaged position in FIG. 5A. The reverse gear 30 is urged in the direction A to mesh with the reverse gear 22 of the input shaft 12, but does not yet mesh with the sleeve gear 24 of the output shaft 14. In the embodiment as shown, both the reverse gear 22 of the input shaft 12 and the reverse gear 30 of the reverse shaft 16 each include respective beveled edges 80 and 82. The beveled edged 80 and 82 oppose one another and may facilitate engage between the reverse gear 22 of the input shaft 12 and the reverse gear 30 of the reverse shaft 16.

Referring now to FIG. 5B, when the reverse gear assembly 20 is in the second partially engaged position, the tabs 72 of the synchronizer member 32 are still engaged with the splined portion 74 of the reverse shaft 16. The synchronizer member 32 is still unable to rotate about the axis A-A of the reverse shaft 16 because of the engagement between the tab 72 and the splined portion 74. The outer surface 64 of the synchronizer member 32 is frictionally engaged with the inner surface 60 of the brake hub 46 of the reverse gear 30. Thus, when the reverse gear 30 meshes with the input shaft 12, the frictional engagement between the outer surface 64 of the synchronizer member 32 and the inner surface 60 of the brake hub 46 of the reverse gear 30 reduces the rotational speed of the input shaft 12. In one embodiment, the rotational speed of the input shaft 12 can be reduced to a speed of below 150 RPM.

FIGS. 6A-6B illustrate the reverse gear assembly 20 in a third fully engaged position. The reverse gear assembly 20 is urged along the reverse shaft 16 in the direction A from the second partially engaged position in FIG. 5A to the third fully engaged position in FIG. 6A. The reverse gear meshes with both the reverse gear 22 of the input shaft 12 as well as the sleeve gear 24 of the output shaft 14, and the transmission is shifted to the reverse gear ratio. When the reverse gear assembly 20 is in the third engaged position, the tabs 72 of the synchronizer member 32 are no longer engaged with the splined portion 74 of the reverse shaft 16, and the reverse gear 30 is able to freely rotate about the reverse shaft 16. Turning to FIG. 6B, when the reverse gear assembly 20 is in the third engaged position, the tabs 72 of the synchronizer member 32 are no longer engaged with the splined portion 74 of the reverse shaft 16. As a result, the synchronizer member 32 is now able to rotate about the axis A-A of the reverse shaft 16.

The reverse gear 30, the reverse gear 22 of the input shaft 12, and the sleeve gear 24 of the output shaft 14 each employ gear teeth that are designed to slidably engage with one another. Sliding two gears together for meshing typically requires that the respective gears are rotating at relatively similar speeds and in the same direction. If gears are meshed together rotating at dissimilar or in opposite rotational directions, an impact or gear clashing may occur. The output shaft 14 is usually stationary or rotating in the opposite direction from the reverse shaft 16 just before the sleeve gear 24 of the output shaft 14 engages with the reverse gear 30 of the reverse shaft 16. However, the reverse gear 30 and the sleeve gear 24 can still smoothly mesh together. This is because the reverse gear assembly 20 has already reduced the rotational speed of the input shaft 12 in the second partially engaged position (illustrated in FIGS. 5A-5B). For example, in one embodiment the rotational speed of the input shaft 12 and the reverse shaft 16 are each reduced to about less than 150 RPM as the reverse gear 30 meshes with the sleeve gear 24. The smooth meshing of the reverse and sleeve gears 24 and 30 reduces the occurrence of an impact or gear clashing, especially when compared to a reverse shaft that is rotating at a much higher RPM.

The reverse gear assembly 20 is employed to reduce the speed of the input shaft 12 and the reverse gear 30 first before meshing with the output shaft 14, thereby reducing the occurrence of gear clash and component damage. Moreover, the reverse gear assembly 20 is compact, interchangeable with transmissions that do not employ a reverse gear assembly 20, and is also typically less expensive than implementing a reverse gear synchronizer system. The reverse gear assembly 20 is pre-loaded, therefore the reverse gear 30 does not require increased effort to shift the transmission 10 from the neutral gear ratio to the reverse gear ratio.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission having an input shaft and an output shaft, the transmission comprising:
    an input gear rotatably fixed for common rotation by the input shaft;
    an output gear rotatably fixed for common rotation by the output shaft;
    a third shaft disposed generally parallel to the input and output shafts, the third shaft having an outer surface that includes a splined portion and a non-splined portion;
    a reverse gear assembly rotatably fixed for common rotation by the third shaft, the reverse gear assembly including:
        a reverse gear disposed on the third shaft, the reverse gear having a first side, a second side opposite the first side and a hub extending from the first side, wherein the hub includes an inner gear surface and an outer gear surface, the inner gear surface having a conical profile;
        a synchronizer member disposed on and slidable between the splined portion and the non-splined portion of the third shaft, wherein the synchronizer member has an inner synchronizer surface defining an aperture and a conical outer synchronizer surface, and wherein the outer synchronizer surface opposes and is frictionally engaged with the inner gear surface the hub of the reverse gear to reduce relative rotation between the reverse gear and the synchronizer member, and wherein the inner synchronizer surface has at least one radially extending tab selectively engagable with the splined portion of the third shaft;
        an annular retaining member disposed on the third shaft having an inner retaining surface, wherein a portion of the inner retaining surface is fixedly engaged with the outer gear surface of the hub; and
        a synchronizer spring disposed on the third shaft and located between the retaining member and the synchronizer member, wherein the inner surface of the retaining member makes contact with and pre-loads the spring, and wherein the spring exerts a biasing force on the synchronizer member to selectively axially move the synchronizer from the splined to the non-splined portions of the third shaft, and
    wherein the reverse gear assembly is selectively axially moveable along the third shaft to engage the input and output gears.

2. The transmission of claim 1 wherein the reverse gear assembly is selectively disposed in at least one of a first position, a second position, and a third position, and wherein:
    in the first position the reverse gear is not in contact with the input gear and the output gear;
    in the second position the reverse gear is meshed with the input gear member, and wherein the at least one radially extending tab of the synchronizer member is engaged with the splined portion of the third shaft such that the synchronizer member is generally unable to rotate about the third shaft; and
    in the third position the reverse gear is meshed with both of the input gear and the output gear.

3. The transmission of claim 2 wherein the at least one radially extending tab is not engaged with the splined portion of the third shaft in the third position such that the synchronizer member rotates about the third shaft.

4. The transmission of claim 1 wherein the reverse gear further includes a second hub extending from the second side, and wherein the second hub has a radial groove that is configured to receive a selectively operated linkage member.

5. The transmission of claim 1 wherein the synchronizer member includes four radially extending tabs.

6. The transmission of claim 1 wherein the synchronizer spring is a wave spring.

7. The transmission of claim 1 wherein the outer synchronizer surface is textured and to provide frictional engagement between the synchronizer member and the reverse gear.

8. The transmission of claim 7 wherein the textured surface includes a series of radially oriented raised ridges.

9. The transmission of claim 1 wherein the input gear of the input shaft has a first width and the output gear of the output shaft has a second width, and wherein the first width is greater than the second width.

10. A transmission having an input shaft and an output shaft, the transmission comprising:
    an input gear rotatably fixed for common rotation by the input shaft;
    an output gear rotatably fixed for common rotation by the output shaft;
    a third shaft disposed generally parallel to the input and output shafts, the third shaft having an outer surface that includes a splined portion and a non-splined portion;
    a reverse gear assembly rotatably fixed for common rotation by the third shaft, the reverse gear assembly including:
        a reverse gear disposed on the third shaft, the reverse gear having a first side, a second side opposite the first side and a hub extending from the first side, wherein the hub includes an inner gear surface and an outer gear surface, the inner gear surface having a conical profile;
        a synchronizer member disposed on and slidable between the splined portion and the non-splined portion of the third shaft, wherein the synchronizer member has an inner synchronizer surface defining an aperture and a conical outer synchronizer surface, and wherein the outer synchronizer surface opposes and is frictionally engaged with the inner gear surface the hub of the reverse gear to reduce relative rotation between the reverse gear and the synchronizer member, and wherein the inner synchronizer surface has at least one radially extending tab selectively engagable with the splined portion of the third shaft;
        an annular retaining member disposed on the third shaft having an inner retaining surface, wherein a portion of the inner retaining surface is fixedly engaged with the outer gear surface of the hub; and
        a synchronizer spring disposed on the third shaft and located between the retaining member and the synchronizer member, wherein the inner surface of the retaining member makes contact with and pre-loads the spring, and wherein the spring exerts a biasing force on the synchronizer member to selectively axially move the synchronizer from the splined to the non-splined portions of the third shaft,
    wherein the reverse gear assembly is selectively axially moveable along the third shaft to engage the input and output gears, wherein the reverse gear assembly is selectively disposed in at least one of a first position, a second position, and a third position, where in the first position the reverse gear is not in contact with the input gear and the output gear;

in the second position the reverse gear is meshed with the input gear member, and wherein the at least one radially extending tab of the synchronizer member is engaged with the splined portion of the third shaft such that the synchronizer member is generally unable to rotate about the third shaft; and in the third position the reverse gear is meshed with both of the input gear and the output gear.

11. The transmission of claim 10 wherein the at least one radially extending tab is not engaged with the splined portion of the third shaft in the third position such that the synchronizer member rotates about the third shaft.

12. The transmission of claim 10 wherein the reverse gear further includes a second hub extending from the second side, and wherein the second hub has a radial groove that is configured to receive a selectively operated linkage member.

13. The transmission of claim 10 wherein the synchronizer member includes four radially extending tabs.

14. The transmission of claim 10 wherein the synchronizer spring is a wave spring.

15. The transmission of claim 10 wherein the outer synchronizer surface is textured and to provide frictional engagement between the synchronizer member and the reverse gear.

16. The transmission of claim 15 wherein the textured surface includes a series of radially oriented raised ridges.

17. A transmission having an input shaft and an output shaft, the transmission comprising:
   an input gear rotatably fixed for common rotation by the input shaft;
   an output gear rotatably fixed for common rotation by the output shaft;
   a third shaft disposed generally parallel to the input and output shafts, the third shaft having an outer surface that includes a splined portion and a non-splined portion;
   a reverse gear assembly rotatably fixed for common rotation by the third shaft, the reverse gear assembly including:
      a reverse gear disposed on the third shaft, the reverse gear having a first side, a second side opposite the first side and a hub extending from the first side, wherein the hub includes an inner gear surface and an outer gear surface, the inner gear surface having a conical profile;
      a synchronizer member disposed on and slidable between the splined portion and the non-splined portion of the third shaft, wherein the synchronizer member has an inner synchronizer surface defining an aperture and a conical outer synchronizer surface, and wherein the outer synchronizer surface opposes and is frictionally engaged with the inner gear surface the hub of the reverse gear to reduce relative rotation between the reverse gear and the synchronizer member, and wherein the inner synchronizer surface has at least one radially extending tab selectively engagable with the splined portion of the third shaft;
      an annular retaining member disposed on the third shaft having an inner retaining surface, wherein a portion of the inner retaining surface is fixedly engaged with the outer gear surface of the hub; and
      a synchronizer spring disposed on the third shaft and located between the retaining member and the synchronizer member, wherein the inner surface of the retaining member makes contact with and pre-loads the spring, and wherein the spring exerts a biasing force on the synchronizer member to selectively axially move the synchronizer from the splined to the non-splined portions of the third shaft,
   wherein the reverse gear assembly is selectively axially moveable along the third shaft to engage the input and output gears,
   wherein the reverse gear assembly is selectively disposed in at least one of a first position, a second position, and a third position, wherein the first position the reverse gear is not in contact with the input gear and the output gear;
   in the second position the reverse gear is meshed with the input gear member, and wherein the at least one radially extending tab of the synchronizer member is engaged with the splined portion of the third shaft such that the synchronizer member is generally unable to rotate about the third shaft; and
   in the third position the reverse gear is meshed with both of the input gear and the output gear, and the at least one radially extending tab is not engaged with the splined portion of the third shaft such that the synchronizer member rotates about the third shaft.

18. The transmission of claim 17 wherein the reverse gear further includes a second hub extending from the second side, and wherein the second hub has a radial groove that is configured to receive a selectively operated linkage member.

19. The transmission of claim 17 wherein the synchronizer member includes four radially extending tabs.

20. The transmission of claim 17 wherein the synchronizer spring is a wave spring.

* * * * *